United States Patent
Raffaelli (10) Patent No.: US 11,230,339 B2
(45) Date of Patent: Jan. 25, 2022

(54) FORECARRIAGE OF A ROLLING MOTOR VEHICLE WITH ROLLING BLOCK

(71) Applicant: PIAGGIO & C. S.p.A., Pisa (IT)

(72) Inventor: Andrea Raffaelli, Pisa (IT)

(73) Assignee: PIAGGIO & C. S.P.A, Pisa (IT)

( * ) Notice: Subject to any disclaimer, the term of this patent is extended or adjusted under 35 U.S.C. 154(b) by 97 days.

(21) Appl. No.: 16/472,235

(22) PCT Filed: Dec. 20, 2017

(86) PCT No.: PCT/IB2017/058219
§ 371 (c)(1),
(2) Date: Jun. 21, 2019

(87) PCT Pub. No.: WO2018/116210
PCT Pub. Date: Jun. 28, 2018

(65) Prior Publication Data
US 2021/0129933 A1 May 6, 2021

(30) Foreign Application Priority Data
Dec. 21, 2016 (IT) .................. 102016000129491

(51) Int. Cl.
*B62K 5/027* (2013.01)
*B62K 5/08* (2006.01)
*B62K 5/10* (2013.01)

(52) U.S. Cl.
CPC ............ *B62K 5/027* (2013.01); *B62K 5/08* (2013.01); *B62K 5/10* (2013.01); *B60G 2300/122* (2013.01); *B60G 2300/45* (2013.01)

(58) Field of Classification Search
CPC . B62K 5/027; B62K 5/10; B62K 5/08; B60G 2300/45; B60G 2300/122
See application file for complete search history.

(56) References Cited

U.S. PATENT DOCUMENTS 5,513,875 A 5/1996 Tahara
6,805,362 B1 10/2004 Melcher
(Continued)

FOREIGN PATENT DOCUMENTS

CN 201670311 U 12/2010
CN 102596697 A 7/2012
(Continued)

OTHER PUBLICATIONS

International Search Report for corresponding application PCT/IB2017/058219 filed Dec. 20, 2017; dated Apr. 9, 2018.
(Continued)

*Primary Examiner* — Darlene P Condra
(74) *Attorney, Agent, or Firm* — Cantor Colburn LLP (57) ABSTRACT

The present invention relates to a forecarriage of a rolling motor vehicle with three or four wheels, comprising: a forecarriage frame (16); at least one pair of front wheels (10', 10") kinematically connected to each other and to the forecarriage frame by a kinematic roll mechanism (20) which enables the same to roll in a synchronous and specular manner; an anti-roll system (100) comprising a rod (110) having a first (111) and a second end (112) opposite each other which connect by means of hinging means (101', 101" and 102', 102") a first (60) and a second anchoring portion (60) of forecarriage (8) directly to each other. At least one of said first (60) and second anchoring portions (60) is subject to roll movements of said two front wheels (10', 10"). The hinging means (101', 101" and 102', 102") are configured to passively follow the movements of two anchoring portions. The hinging means (101', 101") at the first end (111) of the rod comprise at least a first roll hinge (101') which has its hinge axis substantially orthogonal to a rolling plane of the two front wheels and is connected to the first anchoring portion (60). The anti-roll system comprises a first blocking
(Continued)

device suitable to reversibly block a rotation angle α of rod (110) with respect to the first roll hinge 101' at the first end (111). Such an angle of rotation a corresponds to the roll angle of the rod.

16 Claims, 8 Drawing Sheets

(56) References Cited

U.S. PATENT DOCUMENTS

| | | | |
|---|---|---|---|
| 7,243,765 | B2 | 7/2007 | Marcacci |
| 9,211,773 | B2 | 12/2015 | Kitamura |
| 9,238,494 | B2 | 1/2016 | Iizuka |
| 2005/0167174 | A1* | 8/2005 | Marcacci ............... B62K 5/08 180/76 |
| 2006/0163825 | A1 | 6/2006 | Hamm |
| 2006/0226628 | A1 | 10/2006 | Lindsay |
| 2006/0255550 | A1 | 11/2006 | Pfeil |
| 2008/0238005 | A1* | 10/2008 | James ................. B62K 5/10 280/5.509 |
| 2010/0044977 | A1* | 2/2010 | Hughes ............... B60G 21/007 280/5.509 |
| 2013/0161919 | A1 | 6/2013 | Gaillard-Groleas |
| 2015/0158360 | A1 | 6/2015 | Uebayashi |
| 2015/0203154 | A1 | 7/2015 | Mighell |
| 2015/0246704 | A1* | 9/2015 | Takano ................ B60G 3/01 280/269 |
| 2015/0329165 | A1 | 11/2015 | Page |
| 2016/0229249 | A1 | 8/2016 | Mori |
| 2016/0229480 | A1 | 8/2016 | Mori |
| 2017/0106930 | A1* | 4/2017 | Hara .................... B62K 5/027 |
| 2017/0106935 | A1* | 4/2017 | Hara .................... B62K 5/027 |
| 2018/0086168 | A1 | 3/2018 | Iguchi |
| 2018/0086169 | A1 | 3/2018 | Igichi |
| 2018/0265157 | A1 | 9/2018 | Hara |
| 2019/0264906 | A1 | 8/2019 | Takahashi |
| 2019/0375262 | A1 | 12/2019 | Raffaelli |
| 2019/0375476 | A1 | 12/2019 | Raffaelli |

FOREIGN PATENT DOCUMENTS

| | | |
|---|---|---|
| CN | 103796874 A | 5/2014 |
| CN | 104129463 A | 11/2014 |
| CN | 104487324 A | 4/2015 |
| CN | 104487333 A | 4/2015 |
| CN | 204623679 U | 9/2015 |
| CN | 105593044 A | 5/2016 |
| CN | 109552513 B | 6/2020 |
| DE | 19637159 B4 | 9/2004 |
| EP | 2345576 A1 | 7/2011 |
| EP | 2810861 A1 | 12/2014 |
| EP | 2899107 A1 | 7/2015 |
| EP | 3040220 A1 | 7/2016 |
| FR | 2953184 A1 | 6/2011 |
| GB | 2537387 A | 10/2016 |
| JP | H10138929 A | 5/1998 |
| JP | 2009203651 A | 9/2009 |
| JP | 2010036689 A | 2/2010 |
| JP | 2010184508 A | 8/2010 |
| JP | 2012056503 A | 3/2012 |
| JP | 2012143364 A | 8/2012 |
| JP | 2014065381 A | 4/2014 |
| TW | 201117997 A | 6/2011 |
| TW | 201321251 A | 6/2013 |
| TW | 201420410 A | 6/2014 |
| WO | 0016998 A1 | 3/2000 |
| WO | 2010010245 A1 | 1/2010 |
| WO | 2010054894 A1 | 5/2010 |
| WO | 2011161334 A1 | 12/2011 |
| WO | 2014046280 A1 | 3/2014 |
| WO | 2015146660 A1 | 10/2015 |
| WO | 2015146679 A1 | 10/2015 |
| WO | 2016009329 A1 | 1/2016 |

OTHER PUBLICATIONS

International Search Report for corresponding application PCT/IB2017/058220 filed Dec. 20, 2017; dated Apr. 9, 2018.
International Search Report for corresponding application PCT/IB2017/058221 filed Jun. 28, 2018; dated Apr. 9, 2018.
International Search Report for corresponding application PCT/IB2017/058223 filed Dec. 20, 2017; dated Sep. 4, 2018.
International Search Report for corresponding application PCT/IB2017/058224 filed Dec. 20, 2017; dated Apr. 9, 2018.
Written Opinion for corresponding application PCT/IB2017/058220 filed Dec. 20, 2017; dated Apr. 9, 2018.
Written Opinion for corresponding application PCT/IB2017/058223 filed Dec. 20, 2017; dated Sep. 4, 2018.
Written Opinion for corresponding application PCT/IB2017/058224 filed Dec. 20, 2017; dated Apr. 9, 2018.
Written Opinion of the International Searching Authority for corresponding application PCT/IB2017/058219 filed Dec. 20, 2017; dated Apr. 9, 2018.
Written Opinion for corresponding application PCT/IB2017/058221 filed Jun. 28, 2018; Dated Apr. 9, 2018.

\* cited by examiner

FORECARRIAGE OF A ROLLING MOTOR VEHICLE WITH ROLLING BLOCK

FIELD OF APPLICATION

The present invention relates to a forecarriage of a rolling motor vehicle with rolling block. In particular, the vehicle according to the invention may be a motor vehicle provided with two steering and rolling wheels at the front and a rear drive wheel with fixed axle at the rear.

BACKGROUND ART

In the field of motor vehicles there is a growing supply of "hybrid" vehicles that combine the characteristics of motorcycles, in terms of handling, with the stability of four-wheeled vehicles.

These "hybrid" vehicles are represented, for example, by three-wheeled motor vehicles provided with two front steering wheels and, by four-wheeled motor vehicles known as QUAD.

More specifically, the above three-wheeled motor vehicles are provided with two steering and rolling (i.e. tilting) wheels at the front and a rear drive wheel with fixed axle at the rear. The rear wheel is intended to provide the drive torque and thus allow traction while the front wheels, paired, are intended to provide the directionality of the vehicle. The paired wheels at the forecarriage in addition to steering can tilt and roll. Due to this solution, compared to three-wheeled motor vehicles of which two at the rear, the motor vehicles with two wheels at the forecarriage are equivalent to an actual motorcycle since, just like a motorcycle, the motor vehicle can tilt on bends. Compared to a two-wheeled motor vehicle, such vehicles with two paired wheels at the forecarriage have, however, increased stability ensured by the double support on the ground of the front wheels, similar to that provided by a car.

The front wheels are kinematically connected together by means of kinematic mechanisms that enable the same to roll in a synchronous and specular manner, for example through the interposition of articulated quadrilaterals. These vehicles are further provided with two independent suspensions, one for each of the two front wheels, provided with dampers, also independent.

Three-wheel rolling motor vehicles are therefore designed to provide the handling of a two-wheeled motorcycle and, at the same time, the stability and safety of a motor vehicle with four wheels.

A three-wheeled rolling motor vehicle of this type is described, for example, in the Italian patent application no. IT2003MIA001108 by the same Applicant.

Due to the structural features of this type of vehicles, it is possible that under certain conditions, for example at very low speeds or during stops, the motor vehicle may fall as a result of an accidental and/or uncontrolled roll movement.

This problem has been addressed by providing the above vehicles with rolling block systems, operated by the user manually and/or by an automatic control system.

The roll block can be obtained in a variety of ways, but all substantially sharing the reversible block of a component that is configured to follow the rolling movements of one or both rolling wheels. The blocking of the rolling movements of such a component determines kinematically, directly or indirectly, the blocking of the rolling of the two front wheels of the motor vehicle.

The component to be reversibly blocked can be an element that is already present in the rolling structure of the motor vehicle. For example, according to a very popular solution, the component to be blocked can be an element of the articulated quadrilateral that defines the rolling kinematic mechanism, preferably one of the two uprights. The blocking of the movement of an upright of the quadrilateral prevents the latter from varying its configuration and, therefore, indirectly the two wheels from rolling. If the articulated quadrilateral is connected to the axle journals of the two rolling wheels through the interposition of the suspensions, the roll movements due to asymmetric spring movements of the dampers are excluded from such a block and they will need to be managed independently.

Such a system is described, for example, in the Italian patent application no. IT2004A000171 by the same Applicant. The anti-roll system is described in relation to a rolling motor vehicle provided with a steering system with articulated quadrilateral structure and two independent front suspensions. The anti-roll system comprises: a mechanical clamp adapted to block the rotation of the upper upright of the articulated quadrilateral around the hinge connecting the upright to the frame; two hydraulic clamps operated simultaneously by an electric motor acting on rods placed in parallel to the dampers to also prevent the roll due to an asymmetrical spring movement of two wheels.

Alternatively, the component to be reversibly blocked to block the roll can consist of an element that is added to the rolling structure of the motor vehicle and is specifically designed for this purpose. In particular, this additional element may be associated with the articulated quadrilateral, as a reversible blocking element on the configuration of the quadrilateral itself. This solution is described, for example, in the European patent application EP2810861A1, in the French patent FR2953184 and in the European patent EP2345576B1.

Alternatively, this additional element may consist of a direct interconnection element between the axle journals of two rolling wheels, mechanically released from the frame of the motor vehicle.

In these solutions, "axle journal" of a wheel is the mechanical part of the motor vehicle intended to support the rotation pin of the wheel itself and interconnected it kinematically to the suspensions, the steering device and, in the specific case, to the kinematic roll mechanism. The axle journal can be kinematically integral with the wheel pin, which in turn supports the wheel through bearings. In that case, the axle journal may be made integral with the wheel pin or be mechanically constrained thereto to form one piece. The axle journal can be kinematically integral with the wheel pin, which in turn supports the wheel through bearings.

This technical solution of roll blocking—as kinematically released from the effects induced by the suspensions—allows blocking all the roll movements by acting only on such an additional element, thus including the roll movements generated by an asymmetrical spring movement of two rolling wheels. Such a technical solution is the object of the Italian patent application no. 102015000088087 by the same Applicant. A particular anti-roll system described in that application consists of an extensible rod that connects at the two ends thereof the two axle journals of the front wheels directly to each other by hinging means equivalent to a ball joint. The roll blocking is achieved by blocking the angle of rotation of the rod on the rolling plane at at least one end thereof by means of a dedicated actuator, such as a band brake or a drum brake. The rod so locked prevents the rolling movements of the two wheels. "Rolling plane" means a plane transverse to the longitudinal direction or direction of travel of the motor vehicle, and thus incident the centre line plane of the motor vehicle.

Alternatively, the above additional element may consist of a direct interconnection element between the axle journal of one of the two rolling wheels and the frame of the motor vehicle. Such a technical solution is described in the Italian patent application no. 102015000088091 by the same Applicant. In particular, the anti-roll system consists of an extensible rod that connects at the two ends thereof the axle journal of one of the wheels directly to the frame by hinging means equivalent to a ball joint. The roll blocking is achieved by blocking the angle of rotation of the rod with respect to the rolling plane at at least one of the two ends thereof by means of a dedicated actuator, such as a band brake or a drum brake. The rod so locked prevents the rolling movements of the two wheels. In this case, the rolling movements caused by the asymmetrical spring suspension of both wheels are not blocked, since the springing of the wheel not connected to the frame by the rod is not affected by the rod block itself.

In general, an anti-roll system, based on an interconnection rod that is hinged at its ends by hinging means equivalent to a ball joint and whose angle of rotation on the rolling plane is lockable a at least one end thereof by means of a dedicated actuator has the great advantage compared to other solutions to be easily installed on motor vehicles, and to require per se a limited footprint.

Moreover, such a rod can be extensible or not in length, depending on whether it connects points the distance whereof varies or not during the movements of the motor vehicle (in particular, roll, steering or asymmetric spring suspension). The system can therefore also be easily configured in such a way as to be substantially transparent when driving.

The adoption of belt or drum brakes also allows integrating the actuators directly on the hinging means of the rod, with advantages in terms of ease of installation.

Such a technical solution, however, has the limit of requiring the use of power actuators, having a size sufficient to provide sufficient torque not only to maintain balance in the motor vehicle by blocking the rolling movements thereof, but also to prevent such a balance from being modified by moving all the weight of the motor vehicle on one side. A single actuator must be able to provide torques in the range of 30 kgm. This requires the installation of belt or drum brakes of large size, which effectively annul the space-saving advantage given by the rod. A similar situation would occur also if disc brakes are used.

This limit is also greatly accentuated in case one wants to block the rotation of the rod at both ends to symmetrise the blocking of the roll on the two rolling wheels. In such a case, it would therefore be necessary to install not one, but two actuators, with a doubling of the overall dimensions and costs. A symmetric blocking of the roll is not in itself essential because the two wheels are connected to each other by the kinematic roll mechanism, but it may be suitable to annul the chain of tolerances and elasticity of the components.

A possible alternative to the belt brake or drum brake consists of an extensible strut which in the vicinity of the hinging area diagonally connects the rod to the element to which it is hinged, as described in the already cited Italian patent application no. 102015000088087. The extensible strut is provided with means adapted to block the extension in length thereof. When locked in length, the strut prevents the rod from rotating. This technical solution, however, requires more complicated installation and does not allow to significantly reduce the problem of the overall dimensions.

There is therefore the need to develop a rolling motor vehicle provided with an anti-roll system which, while adopting a rod lockable at one end as a roll blocking element, allows overcoming in whole or in part the limits set forth above.

DISCLOSURE OF THE INVENTION

Therefore, the object of the present invention is to eliminate or at least reduce, the above drawbacks of the prior art by providing a forecarriage of a rolling motor vehicle provided with an anti-roll system that allows combining the simple installation of a rod as a roll blocking element with a small footprint of the system as a whole.

A further object of the present invention is to provide a forecarriage of a rolling motor vehicle provided with an anti-roll system which allows using actuators that are smaller and more cost-effective than those of the prior art.

A further object of the present invention is to provide a forecarriage of a rolling motor vehicle provided with an anti-roll system which allows a non-abrupt blocking of the roll.

A further object of the present invention is to provide a forecarriage of a rolling motor vehicle provided with an anti-roll system which allows making the blocking of the roll of both rolling wheels symmetrical without causing a significant increase in the overall dimensions of the system and relative costs.

A further object of the present invention is to provide a forecarriage of a rolling motor vehicle provided with an anti-roll system that is constructively simple and cost-effective to be made and mount on the vehicle itself.

DESCRIPTION OF THE DRAWINGS

The technical features of the invention can clearly be seen in the content of the claims below, and its advantages will become more readily apparent in the detailed description that follows, made with reference to the accompanying drawings, which illustrate one or more embodiments thereof which are purely exemplary and non-limiting, in which:

DETAILED DESCRIPTION

With reference to the above figures, reference numeral 4 globally denotes a motor vehicle according to the present invention.

For the purposes of this invention, it should be noted that the term motor vehicle must be considered in a broad sense, encompassing any motor vehicle having at least three wheels, i.e. two front wheels, as better described below, and at least one rear wheel. Therefore, the definition of motor vehicle also encompasses the so-called quads, with two wheels at the forecarriage and two wheels at the rear.

The motor vehicle 4 comprises a frame 6 extending from a forecarriage 8 supporting at least two front wheels 10, to a rear 12 supporting one or more rear wheels 14. It is possible to distinguish a left front wheel 10' and a right front wheel 10", wherein the definition of left and right wheel 10', 10" is purely formal and means in relation to a driver of the vehicle. Said wheels are arranged to the left and right of a centre line M-M of the motor vehicle, with respect to an observation point of a driver driving the same.

For the purposes of the present invention, frame 6 of the motor vehicle may have any shape, size and may for example be of the lattice type, the box-like type, single or dual cradle and so on. Frame 6 of the motor vehicle may be in one piece or in multiple parts; for example, frame 6 of the motor vehicle is interconnected with a rear frame 13 which may comprise a rear oscillating swingarm (not shown) supporting one or more rear drive wheels 14. The above rear swingarm may be connected to frame 6 by direct hinging, or by the interposition of crank mechanisms and/or intermediate frames.

According to a general embodiment solution of the present invention, the motor vehicle forecarriage 8 comprises a forecarriage frame 16 and a pair of front wheels 10',10" kinematically connected to each other and to the forecarriage frame 16 by means of a kinematic roll mechanism 20 which preferably enables the same to roll in a synchronous and specular manner.

The motor vehicle forecarriage 8 comprises an anti-roll system 100 in turn comprising a rod 110 having a first 111 and a second end 112 opposite each other which connect by means of hinging means 101', 101" and 102', 102" a first anchoring portion 102 and a second anchoring portion 60 of forecarriage 8 directly to each other.

At least one of said first 60 and second anchoring portions 60 is subject to roll movements of said two front wheels 10', 10". In particular, as explained in greater detail below:
said first 60 and second anchoring portions 60 are both subject to roll movements of said two front wheels 10', 10"; or
only one of said first and second anchoring portions is subject to roll movements of said two front wheels 10',10", while the other anchoring portion is part of the forecarriage frame 16.

Preferably, the above hinging means 101', 101" and 102', 102" are configured to passively follow the movements of said first anchoring portion 60 and said second anchoring portion 60.

Preferably, the hinging means 101', 101" to said first end 111 of the rod comprise at least a first roll hinge 101' which has its hinge axis substantially orthogonal to the rolling plane of the two front wheels 10', 10" and is connected to said first anchoring portion 60.

Said anti-roll system 100 comprises a first blocking device suitable to reversibly block a rotation angle α of said rod 110, preferably with respect to said first roll hinge 101' at the first end 111 of rod 110. Such an angle of rotation α corresponds to the roll angle of rod 110.

"Rolling plane" means a plane transverse to the longitudinal direction or direction of travel Y of the motor vehicle, and thus incident the centre line plane M-M of the motor vehicle.

Operatively, block the rotation of rod 110 at least one end thereof with respect to the roll plane means blocking the roll movements of the forecarriage parts connected to rod 110 and thus consequently blocking the roll movements of the two front wheels 10', 10".

According to a preferred embodiment shown in the accompanying Figures, each front wheel 10', 10" is connected to said kinematic roll mechanism 20 by a respective axle journal 60, which is mechanically connected to a rotation pin 68 of the wheel so as to support it rotatably around an axis of rotation. The forecarriage further comprises suspension means to guarantee each axle journal 60 at least one spring suspension movement with respect to said rolling kinematic mechanism 20.

"Axle journal" of a wheel is the mechanical part of the motor vehicle intended to support the rotation pin of the wheel itself and interconnected it kinematically to the suspensions, the steering device and the above kinematic roll mechanism 20. The axle journal can be kinematically integral with the wheel pin, which in turn supports the wheel through bearings. In that case, the axle journal may be made integral with the wheel pin or be mechanically constrained thereto to form one piece. The axle journal can be kinematically integral with the wheel pin, which in turn supports the wheel through bearings.

According to this preferred embodiment illustrated in the accompanying Figures, the above first and second anchoring portions consist of the axle journals 60 of the two front wheels 10', 10" and are therefore both subject to roll movements of said two front wheels 10', 10". In this case, the blocking of the rotation of rod 110 with respect to said rolling plane determines the block of the rolling movements of the axle journals of both two front wheels, and thus directly of the two wheels themselves.

Alternatively, according to an embodiment not illustrated in the accompanying figures, said rod 110 may connect the axle journal of only one of the two front wheels directly to the forecarriage frame 16. In this case, only one of said first and second anchoring portions is subject to the roll movements of said two front wheels 10', 10". In this case, the blocking of the rotation of the rod with respect to said rolling plane occurs only at a front wheel. Operatively, the blocking of the roll of a single front wheel, however, also automatically determines the rolling block of the other front wheel, due to the kinematic interconnection imposed by the above kinematic roll mechanism.

Preferably, in both embodiments, which provide the connection of rod 110, respectively, to one or both axle journals, the hinging means 101', 101" to the first end of the rod also comprise a cylindrical steering hinge 101" having hinge axis parallel to said rolling plane to allow steering movements to the axle journal. The first roll hinge 101' is connected to said cylindrical steering hinge 101".

The above kinematic roll mechanism 20 may have any configuration provided that it is functional to ensure the front wheels to roll in synchronous and specular manner.

According to the embodiment illustrated in the accompanying Figures, the kinematic roll mechanism 20 is an articulated quadrilateral system.

More in detail, such an articulated quadrilateral system comprises a pair of cross members 24', 24", hinged to the forecarriage frame 16 at middle hinges 28. The cross members 24', 24" are connected to each other, at opposite transverse ends by means of uprights 48 pivoted at said transverse ends at side hinges 52. The cross members 24', 24" and uprights 48 define the above articulated quadrilateral 20.

Preferably, in this case, each of the uprights 48 guides and supports an axle journal 60 of one of said front wheels 10', 10".

According to an embodiment not illustrated in the accompanying Figures, each upright can guide and support the axle journal of the respective front wheel coaxially to a prevailing extension axis thereof. In this case, the suspension means of each front wheel are integrated into the respective upright and ensure a rectilinear spring motion of the axle journal along the prevailing extension axis of the upright.

Alternatively, as illustrated in the accompanying Figures, the articulated quadrilateral kinematic roll mechanism 20 can be implemented in such a way that each of the uprights 48 guides and supports the axle journal 60 of the respective front wheel 10', 10" externally to itself via a kinematic connection system of the roto-translational type Advantageously, according to an embodiment not illustrated in the accompanying Figures, when the kinematic roll mechanism is an articulated quadrilateral system, the above first and second anchoring portions may consist of two components selected from the uprights and the cross members of said articulated quadrilateral system and are therefore both subject to rolling movements of said two front wheels 10', 10". Operatively, the blocking of the rotation of rod 110 with respect to the rolling plane determines the blocking of the articulated quadrilateral configuration, and then as a result of the rolling movements that are allowed by such an articulated quadrilateral system.

Alternatively, according to a further embodiment not illustrated in the accompanying figures, said rod 110 may connect a component selected from the uprights and the cross members of said articulated quadrilateral system directly to the forecarriage frame 16. In this case, only one of said first and second anchoring portions is subject to the roll movements of said two front wheels 10', 10".

Preferably, in both the above embodiments, which provide the connection of rod 110, respectively, between two components of the articulated quadrilateral or between one of such components and the forecarriage frame, the hinging means at the first end 111 of rod 110 may simply consist of the first roll hinge 101'. The articulated quadrilateral is in fact always parallel to said rolling plane in all its different configurations and is transparent to the steering movements, such as the forecarriage frame.

Advantageously, forecarriage 8 is provided with a steering device adapted to control the rotation of the axle journals about respective steering axes of each front wheel 10', 10". The steering device may act directly on the axle journals and be subject to the action of the suspensions, or act indirectly on the axle journals without being subject to the action of the suspensions.

According to a first aspect of the invention, as illustrated in the accompanying Figures, said first blocking device comprises a connecting rod-crank kinematic mechanism 210, 220 which is connected to said rod 110, preferably at the connecting rod 210 by means of a first cylindrical hinge 201, and to said first anchoring portion 60, preferably at said crank 220 by means of a second cylindrical hinge 202 so as to define an articulated quadrilateral.

Preferably, the connecting rod 210 is connected to crank 220 by means of a cylindrical articulation hinge 203.

Preferably, the above first 201 and second cylindrical hinge 202 and the above cylindrical articulation hinge 203 all have an hinge axis parallel to the hinge axis of the first roll hinge 101' and constitute the vertices of said articulated quadrilateral, in which:

two first opposite sides are formed by crank 220 and by the portion of the first end 111 of rod 110 comprised between the first roll hinge 101' and the first cylindrical hinge 201; and the other two opposite sides are formed directly by the first anchoring portion (or by the cylindrical steering hinge 101" which is connected to the first anchoring portion 60, as illustrated in the accompanying figures) and by the portion of connecting rod 210 which is comprised between the first cylindrical hinge 201 and the cylindrical articulation hinge 203. Functionally, the above articulated quadrilateral varies its configuration as the roll angle α of the first end 111 of rod 110 varies due to rolling movements of the two front wheels.

Preferably, the above connecting rod 210 is engaged in the cylindrical articulation hinge 203 or in the first cylindrical hinge 201 with an axial mobile coupling.

Figure 1:
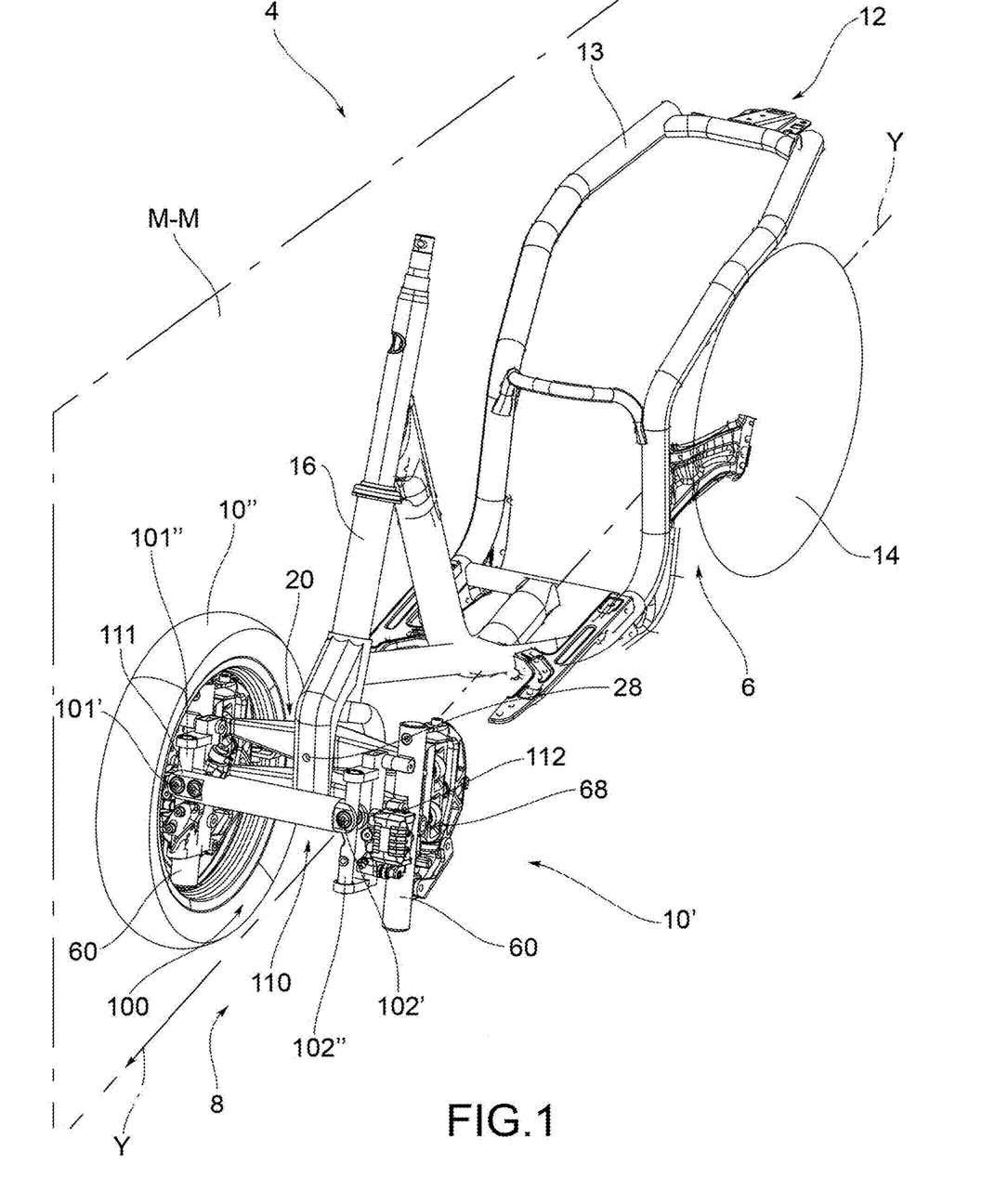
FIG. 1 shows a perspective view of a motor vehicle provided with a forecarriage with roll blocking system according to preferred embodiment of the invention, illustrated with some parts removed to better show others.
Figure 2:
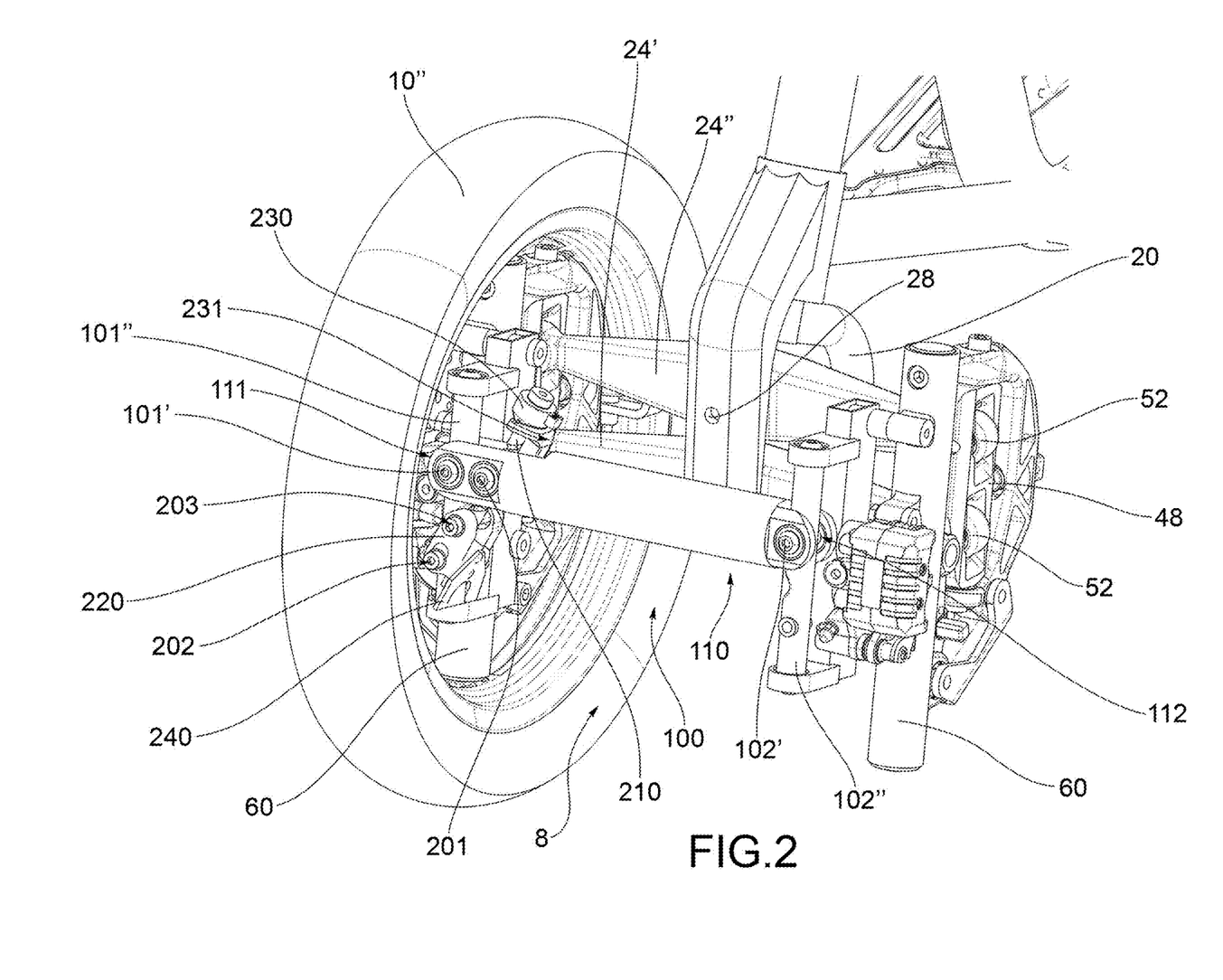
FIG. 2 shows an enlarged view of the forecarriage of the motor vehicle shown in FIG. 1.
Figure 3:
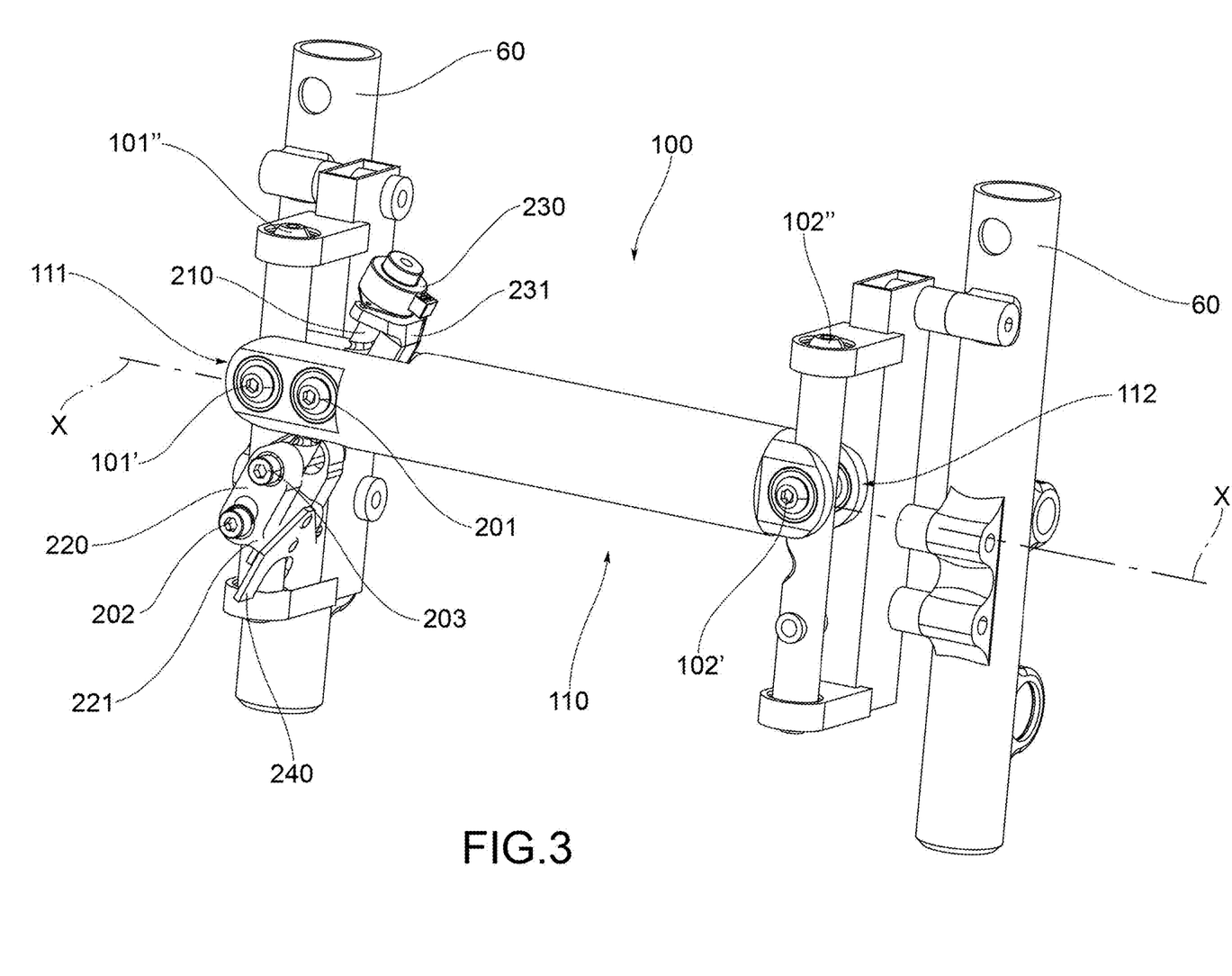
FIG. 3 shows an enlarged perspective view of a detail of the forecarriage of the motor vehicle in FIG. 1, relating to an anti-roll system, illustrated separated from the forecarriage and with a blocking device in the blocked configuration.
Figure 4:
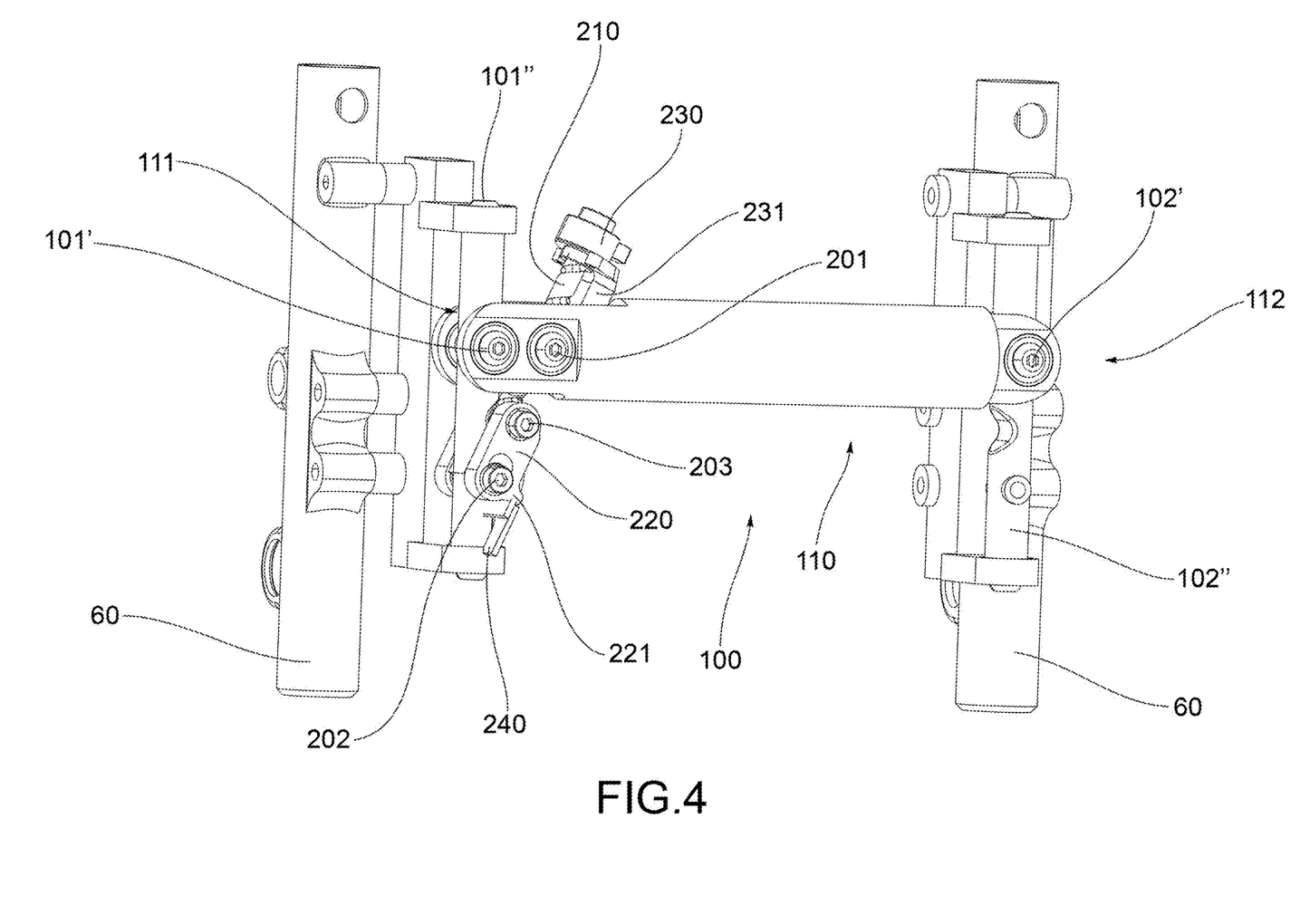
FIGS. 4 and 5 show the detail shown in FIG. 3 according to another perspective view and according to an orthogonal front view, respectively.
Figure 5:
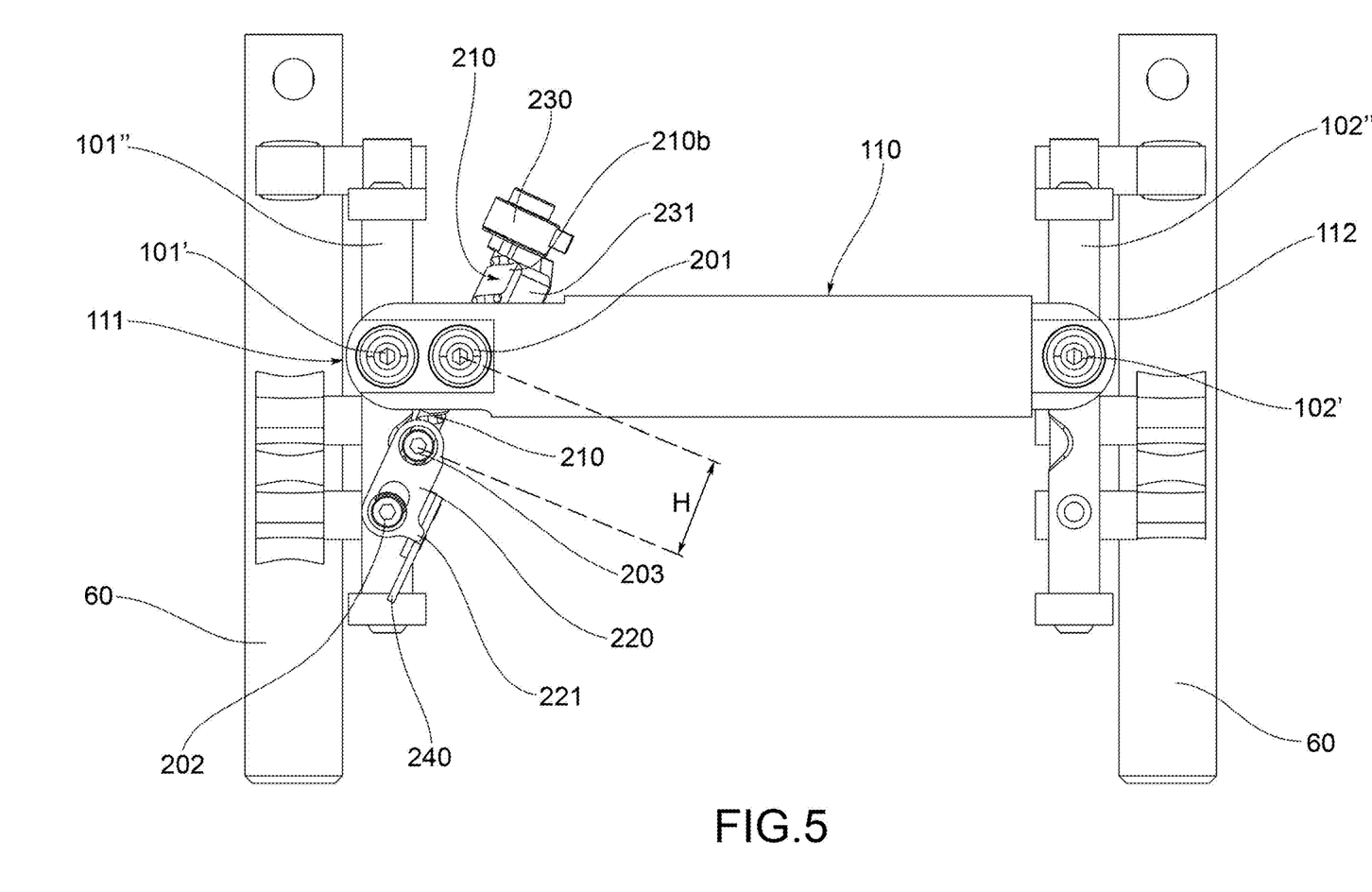
Figure 6:
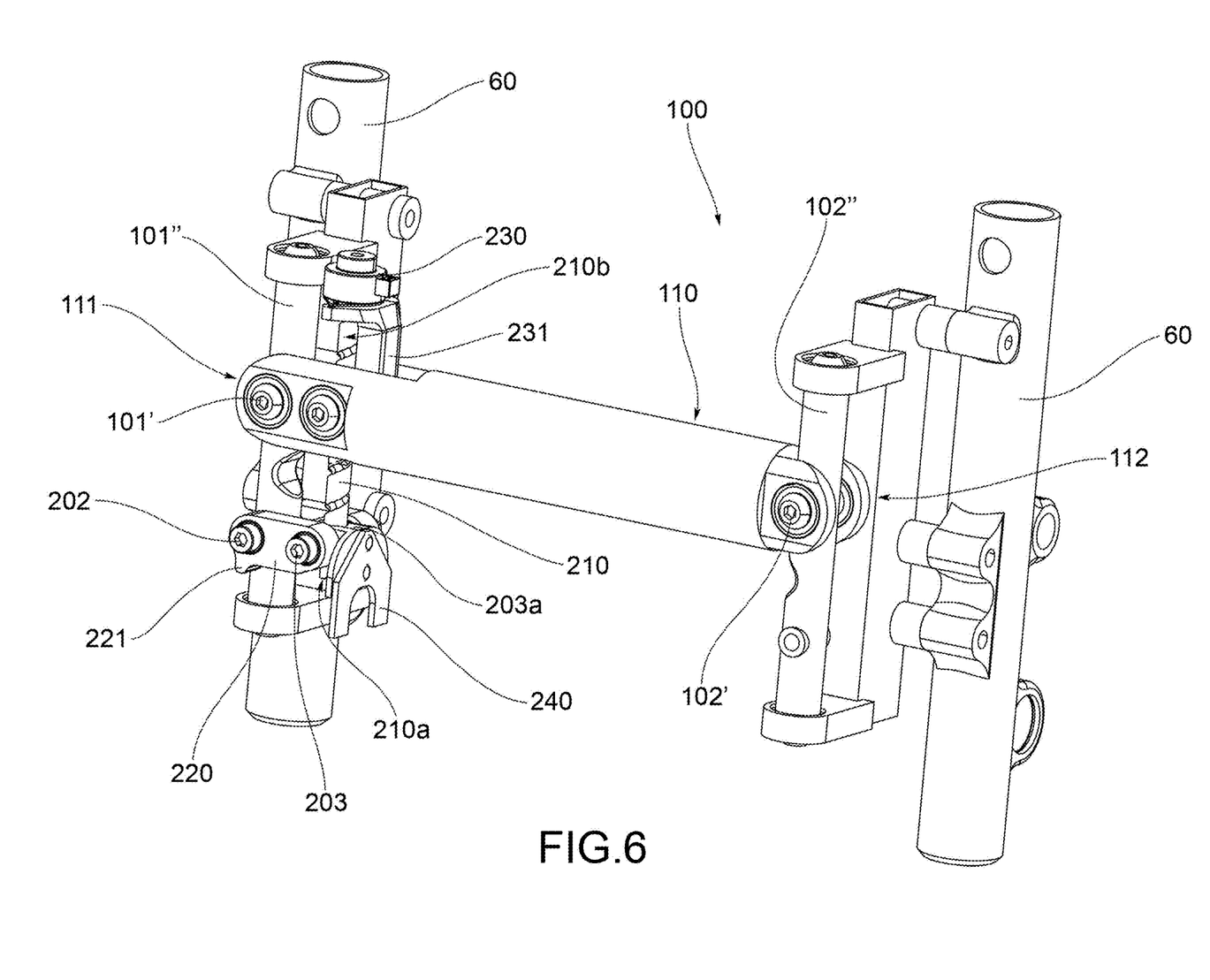
FIG. 6 shows a perspective view of the anti-roll system in FIG. 3, shown with the blocking device in a free configuration.
Figure 7:
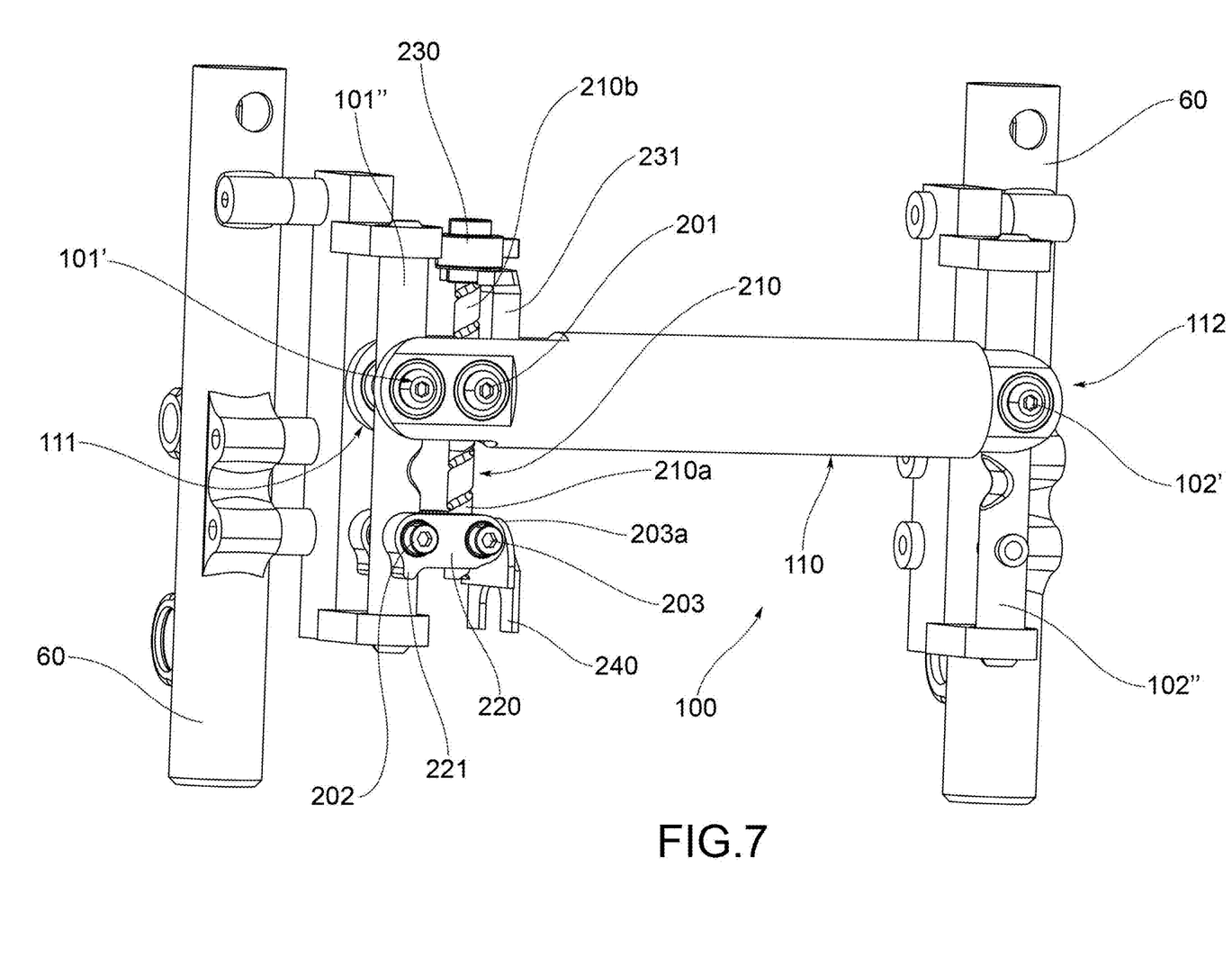
FIGS. 7 and 8 show the detail shown in FIG. 6 according to another perspective view and according to an orthogonal front view, respectively.
Figure 8:
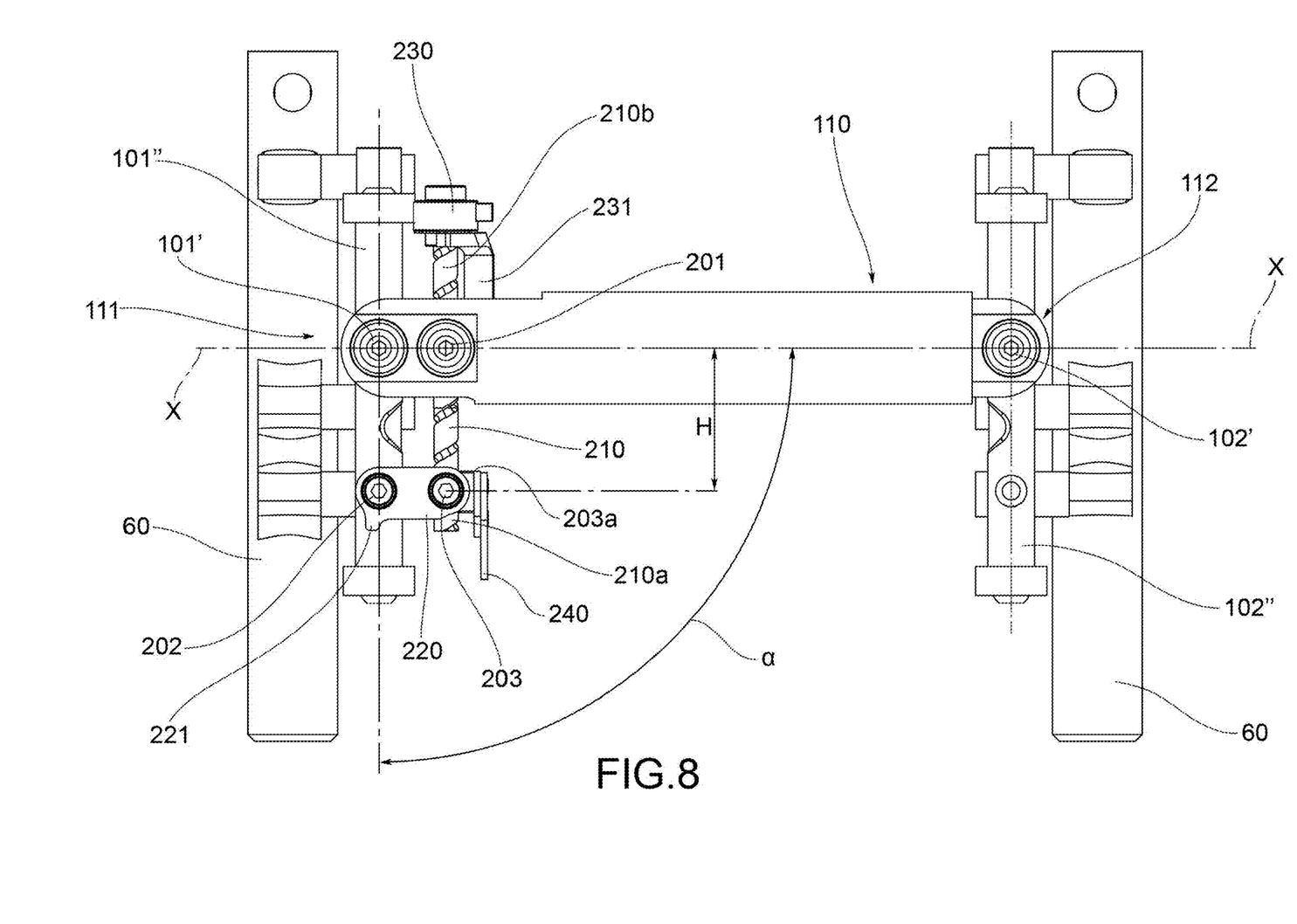

According to another aspect of the invention, the above first blocking device comprises an actuator 230 which is suitable to impart an shift movement to said connecting rod-crank kinematic mechanism in order to vary the configuration of said connecting rod-crank kinematic mechanism 210, 220 between:

a blocked configuration, in which the connecting rod 210 is aligned with crank 220 and the above articulated quadrilateral is degenerated into a triangle, thus defining a blocking strut of the roll angle α of rod 110 (as illustrated in FIGS. 3, 4 and 5); and at least one free configuration, in which the connecting rod 210 is misaligned with respect to crank 220 and the articulated quadrilateral has a non-degenerate configuration which leaves the rolling movements free (as illustrated in FIGS. 6, 7 and 8).

Preferably, the actuator 230 is suitable to impart an axial shift movement to the connecting rod 210 relative to the above cylindrical articulation hinge 203 or to the above first cylindrical hinge 201 to vary the distance H defined between the first cylindrical articulation hinge 203 and the first cylindrical hinge 201.

Operatively, the above actuator 230 is operable to vary said distance H by rotating crank 220 around the second cylindrical hinge 202 and thus varying the configuration of said connecting rod-crank kinematic mechanism 210, 220 between:

a blocked configuration, in which the connecting rod 210 is aligned with crank 220 and the above articulated quadrilateral is degenerated into a triangle, thus defining a blocking strut of the roll angle α of rod 110 (as illustrated in FIGS. 3, 4 and 5); and at least one free configuration, in which the connecting rod 210 is misaligned with respect to crank 220 and the articulated quadrilateral has a non-degenerate configuration which leaves the rolling movements free (as illustrated in FIGS. 6, 7 and 8).

Due to the invention, the blocking of the roll at the first end 111 of rod 110, that is, in other words the application of a torque suitable to prevent variations in the roll angle α around the first roll hinge 101', is not entrusted to actuator 230 but to the connecting rod-crank kinematic mechanism 210, 220.

The function of actuator 230 is only to change the distance H, and thus cause the rotation of crank 220 around the second hinge 202 so as to degenerate the articulated quadrilateral into a triangle, thus defining a locking strut.

Actuator 230 must be able to provide sufficient power to overcome the friction of the hinges, but not to carry out the actual blocking action.

The roll blocking action is instead achieved by means of a static mechanical constraint, which creates a situation of kinematic incompatibility with the movements of rotation of rod 110 around the first roll hinge 101'. To ensure an effective blocking of the roll it is therefore sufficient to statically size the components of the connecting rod-crank kinematic mechanism 210, 220 in such a way that they are able to withstand the blocking torque of the roll.

It is estimated that on average, a system of this type must withstand a torque of about 22 kgm, corresponding to a peak load between the connecting rod and the crank of the order of 700 kg. This load closes on the components of the connecting rod-crank kinematic mechanism, affecting in particular the connecting rod. Actuator 230 is not, however, in any way affected by this load being external to the connecting rod-crank system.

This allows adopting actuators of significantly reduced power compared to traditional systems, with a consequent reduction also of the size and dimensions of the actuators themselves.

Advantageously, in order to reduce to a minimum the friction in the hinges, it is possible to implement the hinges using roller bearings.

From the foregoing, the rolling block system according to the invention thus allows combining the simple installation of a rod as a roll blocking element with a small footprint of the system as a whole. It is in fact possible to use actuators having a significantly smaller size than those required by traditional systems. The size reduction of the actuators has as a consequence not only a reduction of the overall dimensions, but also of costs.

Operatively, as mentioned above, to bring the connecting rod-crank kinematic mechanism 210, 220 to the locked configuration, actuator 230 is operated so as to impart an axial shift movement to the connecting rod 210 with respect to said cylindrical articulation hinge 203 or with respect to said first cylindrical hinge 201, so as to progressively reduce the distance H, i.e. the length of the portion of rod 210 between the cylindrical articulation hinge 203 and the first hinge 201. As a result, crank 220 revolves around the second cylindrical hinge 202 and the articulated quadrilateral progressively deforms. The articulated quadrilateral retains the ability to follow the rolling movements induced on rod 110, while gradually decreasing the width of the rolling oscillations possible around each position. When the crank is aligned with the connecting rod, the system becomes isostatic and locks, thus preventing the rolling movements of the rod and therefore of the motor vehicle.

Operatively, to bring the connecting rod-crank kinematic mechanism 210, 220 to an unlocked configuration, actuator 230 must be operated so as to impart an inverse axial shift movement to the connecting rod 210 with respect to said cylindrical articulation hinge 203 or with respect to said first cylindrical hinge 201 so as to gradually increase the distance H and determine a counter-rotation of the crank. Actuator 230 alone is however not able to carry out this operation as it is kinematically impossible to cause a rotation of crank 220 around the second hinge 202 by applying a force aligned on the axis of the connecting rod, and thus passing through said second hinge.

The above first blocking device thus comprises release means 240 to assist the above actuator 230 in the transition from said blocked configuration to said at least one free configuration.

Preferably, such release means 240 are configured to impress on the above crank 220 a release rotation around the second cylindrical hinge 202 such as to trigger a misalignment between crank 220 and the connecting rod 210.

Once the misalignment between crank 220 and the connecting rod 210 has been triggered, actuator 230 can operate independently.

The above release means 240 thus have the function of ensuring the reversibility of the rolling block.

According to the embodiment shown in the accompanying Figures, said rod 210 consists of an endless screw which is rotationally meshed on a support body 203a of the cylindrical articulation hinge 203 or of the first cylindrical hinge 201. Actuator 230 is adapted to impart to the endless screw 210 a rotational movement on its axis which determines an axial displacement of the connecting rod 210 with respect to the cylindrical articulation hinge 203 or the first cylindrical hinge 201.

Preferably, as illustrated in the accompanying Figures, said endless screw 210 is rotationally meshed on the support body 203a of the cylindrical articulation hinge 203 with a first end portion 210a thereof and is connected to the first cylindrical hinge 201 at a second end portion 210b thereof indirectly by means of a support bracket 231 which is configured to always keep the endless screw 210 passing through the axis of the first cylindrical hinge 201.

Advantageously, according to the embodiment illustrated in the accompanying Figures, the endless screw 210 extends axially outwardly of the articulated quadrilateral with said second end portion 210b. The support bracket 231 is also arranged externally to the articulated quadrilateral. In a preferred embodiment, the endless screw 210 is a recirculating ball screw, to reduce the sliding friction.

In particular, actuator 230 is supported by the support bracket 231 externally to the articulated quadrilateral and is rotationally engaged with the second end portion 210b of the endless screw 210.

Preferably, said release means 240 consist of elastic means which are associated to the cylindrical articulation hinge 203 or to the second cylindrical hinge 202 so that, when crank 220 is aligned with the connecting rod 210, they load themselves elastically and generate a rotation momentum on crank 220 around the second cylindrical hinge 202.

In particular, as illustrated in the accompanying Figures, said elastic means consist of a torsion spring 240 which is integral with the support body 203a of the cylindrical articulation hinge 203 and is oriented so that, when crank 220 is aligned with the connecting rod 210, such a torsion spring 240 engages an appendix 221 of crank 220 projecting radially relative to the second cylindrical hinge 202 flexing elastically and generating on the radially projecting appendix 221 a force having at least one non-radial component.

According to an embodiment not illustrated in the accompanying Figures, crank 210 may comprise a damper arranged along the longitudinal axis thereof, adapted to determine a non-abrupt blocking of the roll when the connecting rod-crank kinematic mechanism 210, 220 is brought into the blocked configuration. Advantageously, the above anti-roll system 100 comprises stop means of said damper adapted to deactivate the damper, preventing oscillations along the axis of crank 220 and thereby cause a static block. Preferably, such a damper is a bidirectional damper.

According to an embodiment not illustrated in the accompanying Figures, the anti-roll system 100 may comprise a second blocking device which is adapted to reversibly block the angle of rotation of rod 110 also at the second end 111 and is identical to the above first blocking device arranged in the first end 111 of rod 110. In this case, the hinging means 102', 102" to said second end 112 of rod 110 comprise a second roll hinge which has its hinge axis substantially orthogonal to the rolling plane of the two front wheels 10', 10" and is connected to the second anchoring portion.

The provision of a first and a second blocking device, respectively, at the first 111 and second end 112 of the rod allows making the blocking of the roll on the two front wheels 10', 10" symmetrical. This applies in particular if rod 110 directly connects the axle journals 60 of the two front wheels 10', 10" to each other.

Advantageously, as illustrated in the accompanying Figures, also if only one blocking system is provided at the first end 111 of the rod, the hinging means 102', 102" at the second end 112 of rod 110 may comprise a second roll hinge which has its hinge axis substantially orthogonal to the rolling plane of the two front wheels 10', 10" and is connected to the second anchoring portion.

Preferably, rod 110 is extensible in the longitudinal direction between said first (111) and second end (112), so as to allow rod 110 to extend in a longitudinal direction along its longitudinal axis X. In particular, rod 110 may be made extensible by providing it with a telescopic structure.

Functionally, the extensibility of rod 110 in the longitudinal direction is necessary if rod 110 connects to each other two parts of the forecarriage whose distance may vary, for example as a result of rolling or steering movements of the wheels. In this case, the longitudinal extensibility is necessary to prevent rod 110 from interfering with the manoeuvrability of the motor vehicle.

This is particularly happens when:
rod 110 is placed to connect the axle journals of the two front wheels and is connected thereto out of the respective steering axes; or
rod 110 is placed to connect an upright and a cross member of the articulated quadrilateral kinematic roll mechanism.

Otherwise, if, for example, rod 110 is placed to connect the two uprights of an articulated quadrilateral system of regular shape (such as rectangular), parallel to the two cross members, the rod extensibility is not required. In fact, in this case, the points connected by rod 110 never vary their distance. Similarly, the extensibility is not necessary if the rod connects the two axle journals at the respective steering axes and at the same height with respect to the ground.

Preferably, as already mentioned, if rod 110 is connected to one or both axle journals, the hinging means 101', 101" to the first end of the rod also comprise a cylindrical steering hinge 101" having hinge axis parallel to the rolling plane to allow steering movements to the axle journal.

More in detail, as illustrated in the accompanying Figures, the first roll hinge 101' is connected to said cylindrical steering hinge 101". The connection to the first anchoring portion (which in this case consists of an axle journal 60) is achieved by means of the above steering hinge 101', which in the accompanying figures is anchored to the axle journal 60 via two or more support arms. In this case, as illustrated in the accompanying Figures, also the second cylindrical hinge 202 is connected to the above steering hinge 101" to allow the connecting rod-crank kinematic mechanism 210, 220 to follow the steering movements.

An object of the present invention is also a method of reversibly blocking the rolling movements of a motor vehicle with three or four wheels, having a forecarriage 8 according to the present invention and in particular as described above.

The above method comprises, in alternation:
a roll block step, in which actuator 230 of at least said first blocking device, which is suitable to reversibly block the rotation angle of said rod 110 at said first end 111, is actuated to bring the configuration of the connecting rod-crank kinematic mechanism 210, 220 from said free configuration to said blocked configuration, making said articulated quadrilateral degenerate into a triangle; and
a roll release step, in which actuator 230 of at least said first blocking device is actuated to bring the configuration of said connecting rod-crank kinematic mechanism from said blocked configuration to said free configuration so as to restore a non-degenerate configuration of said articulated quadrilateral, the misalignment between crank and connecting rod being triggered by said release means.

An object of the present invention is also a motor vehicle 4 having a drive wheel at the rear and a forecarriage 8 according to the present invention and in particular as described above. In further functional aspects, the roll blocking mechanism, according to the present invention, differs from the prior art systems as described below.

The blocking step, but also the opposite, of release, do not have a "transient" step, as occurs in the actuation of a friction brake, such as a mechanical, hydraulic clamp, a belt brake, etc.

In detail, when the pads in a brake come into contact with the disc, a frictional force is generated which increases progressively up to cause the blocking, once a predetermined value has been reached. In other words, the blocking occurs when the load on the pads reaches said predetermined value. For these reasons, we talk about transient that identifies the time interval between the block actuation and the actual mechanical blocking.

In this transient step, therefore, the vehicle is not yet able to determine a static balance condition; at the same time, driving is heavily penalized.

To better explain with reference to a three-wheeled vehicle, the duration of actuation of the electric motor that activates the roll blocking is estimated at about 2 seconds. The vehicle begins to block after only 1 second. This implies that, if due to trajectory requirements the vehicle tilts, the driver feels a greater contrast to his driving input. If the vehicle encounters an obstacle on one side, the suspension may be inactive, or the vehicle may also be rolled on flat road.

In the embodiment described above, a transient condition is not present. The actuator is actuated until the alignment of the hinges occurs; therefore, the quadrilateral is absolutely free because no friction is introduced to the system.

The invention allows several advantages to be achieved, some of them already described. In particular, the rolling block system according to the invention allows combining the simple installation of a rod as a roll blocking element with a small footprint of the system as a whole. It is in fact possible to use actuators having a significantly smaller size than those required by traditional systems. The size reduction of the actuators has as a consequence not only a reduction of the overall dimensions, but also of costs.

The roll blocking system according to the invention allows performing a non-abrupt blocking of the roll in the case in which the crank of the crank-connecting rod system comprises a damper.

In the specific case in which rod 110 is placed to connect the axle journals of the two front wheels 10', 10", the roll blocking system according to the invention can be easily symmetrised on both front wheels 10', 10" by providing a blocking device at both ends of the rod. This does not cause a significant increase in the overall size of the system and the related costs due to the fact that small actuators can be used.

The roll blocking system according to the invention is also constructionally simple and cost-effective to produce and mount on the motor vehicle itself.

According to a preferred embodiment, it is provided a forecarriage (8) of a rolling motor vehicle with three or four wheels, comprising:
- a forecarriage frame 16,
- at least a pair of front wheels 10',10" kinematically connected to each other and to the forecarriage frame 16 by means of a kinematic roll mechanism 20 which enables the same to roll in a synchronous and specular manner,
- an anti-roll system 100 comprising a rod 110 having a first 111 and a second end 112 opposite each other which connect by means of hinging means 101', 101"; 102', 102" a first 60 and a second anchoring portion 60 of the forecarriage 8 directly to each other, wherein at least one of said first 60 and second anchoring portions 60 is subject to roll movements of said two front wheels 10', 10", wherein said hinging means 101', 101", 102', 102" are configured to passively follow the movements of said first 60 and second anchoring portion 60, wherein the hinging means 101', 101" at said first end 111 of the rod comprise at least a first roll hinge 101' which has its hinge axis substantially orthogonal to a rolling plane of the two front wheels 10', 10" and is connected to said first anchoring portion 60, said anti-roll system 100 comprising a first blocking device suitable to reversibly block a rotation angle α of said rod 110 with respect to said first roll hinge 101' at said first end 111, said angle of rotation α corresponding to the roll angle of said rod, wherein said first blocking device comprises a connecting rod-crank kinematic mechanism 210, 220 which is connected to said rod 110 at the connecting rod 210 by means of a first cylindrical hinge 201, and to said first anchoring portion 60 at said crank 220 by means of a second cylindrical hinge 202 so as to define an articulated quadrilateral, said connecting rod 210 being connected to said crank 220 by means of a cylindrical articulation hinge 203, said first 201 and second cylindrical hinge 202 and said cylindrical articulation hinge 203 all having hinge axes parallel to the hinge axis of the first roll hinge 101', wherein said connecting rod 210 is engaged in said cylindrical articulation hinge 203 or in said first cylindrical hinge 201 with an axial mobile coupling, and wherein said first blocking device further comprises:
- an actuator 230 which is suitable to impart an axial shift movement to the connecting rod 210 relative to said cylindrical articulation hinge 203 or relative to said first cylindrical hinge 201 to vary the distance H defined between the cylindrical articulation hinge 203 and the first cylindrical hinge 201, said actuator 230 being operable to vary said distance H by rotating the crank 220 around the second cylindrical hinge 202 and thus vary the configuration of said connecting rod-crank kinematic mechanism 210, 220 between a blocked configuration, in which said connecting rod 210 is aligned with said crank 220 and said articulated quadrilateral is degenerated into a triangle thus defining a strut blocking the roll angle α of the rod 110, and at least one free configuration, in which said connecting rod 210 is misaligned with respect to said crank 220 and said articulated quadrilateral has a non-degenerate configuration which leaves the rolling movements free; and
- release means 240 to assist said actuator 230 in the passage from said blocked configuration to said at least one free configuration, wherein said release means 240 are configured to impress on said crank 220 a release rotation around said second cylindrical hinge 202 such as to trigger a misalignment between said crank 220 and said connecting rod 210.

Moreover, according again to a preferred embodiment, it is provided an anti-roll system for a forecarriage 8 of a rolling motor vehicle with three or four wheels, wherein said forecarriage 8 comprises:—a forecarriage frame 16; and—at least a pair of front wheels 10',10" kinematically connected to each other and to the forecarriage frame 16 by means of a kinematic roll mechanism 20 which enables the same to roll in a synchronous and specular manner, said anti-roll 100 system comprising a rod 110 having a first 111 and a second end 112 opposite each other which is intended—in the installed condition on said forecarriage 8—to connect by means of hinging means 101', 101"; 102', 102" a first 60 and a second anchoring portion 60 of the forecarriage 8 directly to each other, wherein at least one of said first 60 and second anchoring portions 60 is subject to roll movements of said two front wheels 10', 10", wherein said hinging means 101', 101"; 102', 102" are configured to passively follow the movements of said first 60 and second anchoring portion 60, wherein the hinging means 101', 101" at said first end 111 of the rod comprise at least a first roll hinge 101' which has its hinge axis substantially orthogonal to a rolling plane of the two front wheels 10', 10" and is connected to said first anchoring portion 60, said anti-roll system 100 comprising a first blocking device suitable to reversibly block a rotation angle α of said rod 110 with respect to said first roll hinge 101' at said first end 111, said angle of rotation α corresponding to the roll angle of said rod, wherein said first blocking device comprises a connecting rod-crank kinematic mechanism 210,220 which is connected to said rod 110 at the connecting rod 210 by means of a first cylindrical hinge 201, and to said first anchoring portion 60 at said crank 220 by means of a second cylindrical hinge 202 so as to define an articulated quadrilateral, said connecting rod 210 being connected to said crank 220 by means of a cylindrical articulation hinge 203, said first 201 and second cylindrical hinge 202 and said cylindrical articulation hinge 203 all having hinge axes parallel to the hinge axis of the first roll hinge 101', wherein said connecting rod 210 is engaged in said cylindrical articulation hinge 203 or in said first cylindrical hinge 201 with an axial mobile coupling, and wherein said first blocking device further comprises:
- an actuator 230 which is suitable to impart an axial shift movement to the connecting rod 210 relative to said cylindrical articulation hinge 203 or relative to said first cylindrical hinge 201 to vary the distance H defined between the cylindrical articulation hinge 203 and the first cylindrical hinge 201, said actuator 230 being operable to vary said distance H by rotating the crank 220 around the second cylindrical hinge 202 and thus vary the configuration of said connecting rod-crank kinematic mechanism 210, 220 between a blocked configuration, in which said connecting rod 210 is aligned with said crank 220 and said articulated quadrilateral is degenerated into a triangle thus defining a strut blocking the roll angle α of the rod 110, and at least one free configuration, in which said connecting rod 210 is misaligned with respect to said crank 220 and said articulated quadrilateral has a non-degenerate configuration which leaves the rolling movements free; and release means 240 to assist said actuator 230 in the passage from said blocked configuration to said at least one free configuration, wherein said release means 240 are configured to impress on said crank 220 a release rotation around said second cylindrical hinge 202 such as to trigger a misalignment between said crank 220 and said connecting rod 210.

The invention thus conceived thus achieves the intended purposes.

Of course, it may take, in its practical embodiment, also shapes and configurations other than the above without departing from the present scope of protection.

Furthermore, all details may be replaced with technically equivalent elements and dimensions, shapes and materials used may be any according to the needs.

The invention claimed is:

1. Forecarriage of a rolling motor vehicle with three or four wheels, comprising:
   a forecarriage frame,
   at least a pair of front wheels kinematically connected to each other and to the forecarriage frame by means of a kinematic roll mechanism,
   an anti-roll system comprising a rod having a first and a second end opposite each other which connect by means of hinging means a first and a second anchoring portion of the forecarriage directly to each other, wherein at least one of said first and second anchoring portions is subject to roll movements of said two front wheels,
   said anti-roll system comprising a first blocking device suitable to reversibly block a rotation angle of said rod, said angle of rotation corresponding to the roll angle of said rod,
   wherein said first blocking device comprises a connecting rod-crank kinematic mechanism which is connected to said rod, and to said first anchoring portion so as to define an articulated quadrilateral,
   and wherein first blocking device further comprises:
   an actuator which is suitable to impart a shift movement to said connecting rod-crank kinematic mechanism so as to vary the configuration of said connecting rod-crank kinematic mechanism between a blocked configuration, in which said connecting rod of said connecting rod-crank kinematic mechanism is aligned with a crank of said connecting rod-crank kinematic mechanism and said articulated quadrilateral is degenerated into a triangle thus defining a strut blocking the roll angle of the rod, and at least one free configuration, in which said connecting rod is misaligned with respect to said crank and said articulated quadrilateral has a non-degenerate configuration which leaves the roll movements free; and
   release means to assist said actuator in the passage from said blocked configuration to said at least one free configuration.

2. Forecarriage according to claim 1, wherein the hinging means at said first end of the rod comprise at least a first roll hinge which has its hinge axis substantially orthogonal to a rolling plane of the two front wheels and is connected to said first anchoring portion.

3. Forecarriage according to claim 2, wherein said crank comprises a damper along the axis of the crank, suitable to determine a non-abrupt blocking of the roll movement when the kinematic connecting rod-crank is brought into the blocked configuration and wherein stop means of said damper are provided, suitable to deactivate said damper preventing oscillations along the axis of the crank and thus determine a static block.

4. Forecarriage according to claim 1, wherein said connecting rod-crank kinematic mechanism is connected to said rod at the connecting rod by means of a first cylindrical hinge, and to said first anchoring portion at said crank by means of a second cylindrical hinge, and wherein said connecting rod is connected to said crank by means of a cylindrical articulation hinge, said first and second cylindrical hinge and said cylindrical articulation hinge all having hinge axes parallel to the hinge axis of a first roll hinge, in particular said connecting rod being engaged in said cylindrical articulation hinge or in said first cylindrical hinge with an axial mobile coupling.

5. Forecarriage according to claim 4, wherein said actuator is suitable to impart an axial shift movement to the connecting rod relative to said cylindrical articulation hinge or relative to said first cylindrical hinge to vary a distance defined between the cylindrical articulation hinge and the first cylindrical hinge, said actuator being operable to vary said distance by rotating the crank around the second cylindrical hinge.

6. Forecarriage according to claim 4, wherein said release means are configured to impress on said crank a release rotation around said second cylindrical hinge such as to trigger a misalignment between said crank and said connecting rod.

7. Forecarriage according to claim 4, wherein said connecting rod consists of an endless screw which is rotationally meshed on a support body of said cylindrical articulation hinge or of said first cylindrical hinge, said actuator being suitable to impart to said endless screw a rotation movement on its axis that determines an axial shift of the connecting rod relative to the cylindrical articulation hinge or to the first cylindrical hinge.

8. Forecarriage according to claim 4, wherein said release means consist of elastic means which are associated to said cylindrical articulation hinge or to said second cylindrical hinge so that, when the crank is aligned with said connecting rod, they load themselves elastically and generate a rotation momentum on the crank around said second cylindrical hinge.

9. Forecarriage according to claim 4, wherein said release means consist of elastic means which are associated to said cylindrical articulation hinge or to said second cylindrical hinge so that, when the crank is aligned with said connecting rod, they load themselves elastically and generate a rotation momentum on the crank around said second cylindrical hinge and wherein said elastic means consist of a torsion spring which is integral with the support body of said cylindrical articulation hinge and is oriented so that, when the crank is aligned with the connecting rod, said torsion spring engages an appendix of said crank projecting radially relative to said second cylindrical hinge flexing elastically and generating on said radially projecting appendix a force having at least one non-radial component.

10. Forecarriage according to claim 1, wherein the hinging means at said second end of the rod comprise at least a second roll hinge which has its own hinge axis substantially orthogonal to a rolling plane of the two front wheels and is connected to said second anchoring portion and wherein said anti-roll system comprises a second blocking device which is suitable to reversibly block the rotation angle of said rod in said second end, and is identical to said first blocking device placed in said first end.

11. Forecarriage according to claim 1, wherein said rod is extensible in the longitudinal direction between said first and second end.

12. Forecarriage according to claim 1, wherein each of said two front wheels is connected to said kinematic roll mechanism by a respective axle journal, the latter being mechanically connected to a rotation pin of the wheel so as to support it rotatably around an axis of rotation, said forecarriage comprising suspension means to guarantee each axle journal at least one spring suspension movement with respect to said rolling kinematic mechanism.

13. Forecarriage according to claim 1, wherein said kinematic rolling mechanism comprises:—a pair of cross members, hinged to the forecarriage frame at middle hinges;—a pair of uprights, which are pivoted at opposite transverse ends of said cross members at side hinges, wherein said pair of cross members and said pair of uprights define an articulated quadrilateral kinematic mechanism.

14. Motor vehicle having a drive wheel at the rear and a forecarriage according to claim 1.

15. Method of blocking the roll movements of a motor vehicle with three or four wheels, having a forecarriage according to claim 1, said method alternately comprising:
- a roll block step, in which the actuator of at least said first blocking device suitable to reversibly block the rotation angle of said rod at said first end is actuated to bring the configuration of said connecting rod-crank kinematic mechanism from said free configuration to said blocked configuration, making said articulated quadrilateral degenerate into a triangle; and
- a roll release step, in which the actuator of at least said first blocking device is actuated to bring the configuration of said connecting rod-crank kinematic mechanism from said blocked configuration to said free configuration so as to restore a non-degenerate configuration of said articulated quadrilateral, the misalignment between crank and connecting rod being triggered by said release means.

16. Anti-roll system of a forecarriage of a rolling motor vehicle with three or four wheels, wherein said forecarriage comprises:
- a forecarriage frame; and
- at least a pair of front wheels, kinematically connected to each other and to the forecarriage frame by means of a kinematic roll mechanism,
- said anti-roll system comprising a rod having a first and a second end opposite each other which is intended—in the installed condition on said forecarriage—to connect by means of hinging means a first and a second anchoring portion of the forecarriage directly to each other, wherein at least one of said first and second anchoring portions is subject to roll movements of said two front wheels,
- said anti-roll system comprising a first blocking device suitable to reversibly block a rotation angle of said rod, said angle of rotation corresponding to the roll angle of said rod,
- wherein said first blocking device comprises a connecting rod-crank kinematic mechanism which is connected to said rod, and to said first anchoring portion so as to define an articulated quadrilateral and wherein said first blocking device further comprises:
- an actuator which is suitable to impart a shift movement to said connecting rod-crank kinematic mechanism so as to vary the configuration of said connecting rod-crank kinematic mechanism between a blocked configuration, in which said connecting rod of said connecting rod-crank kinematic mechanism is aligned with a crank of said connecting rod-crank kinematic mechanism and said articulated quadrilateral is degenerated into a triangle thus defining a strut blocking the roll angle of the rod, and at least one free configuration, in which said connecting rod is misaligned with respect to said crank and said articulated quadrilateral has a non-degenerate configuration which leaves the roll movements free; and
- release means to assist said actuator in the passage from said blocked configuration to said at least one free configuration.

\* \* \* \* \*